Feb. 23, 1937.  F. N. BARD  2,071,997
WATER SOFTENING APPARATUS
Filed July 6, 1931   5 Sheets-Sheet 1
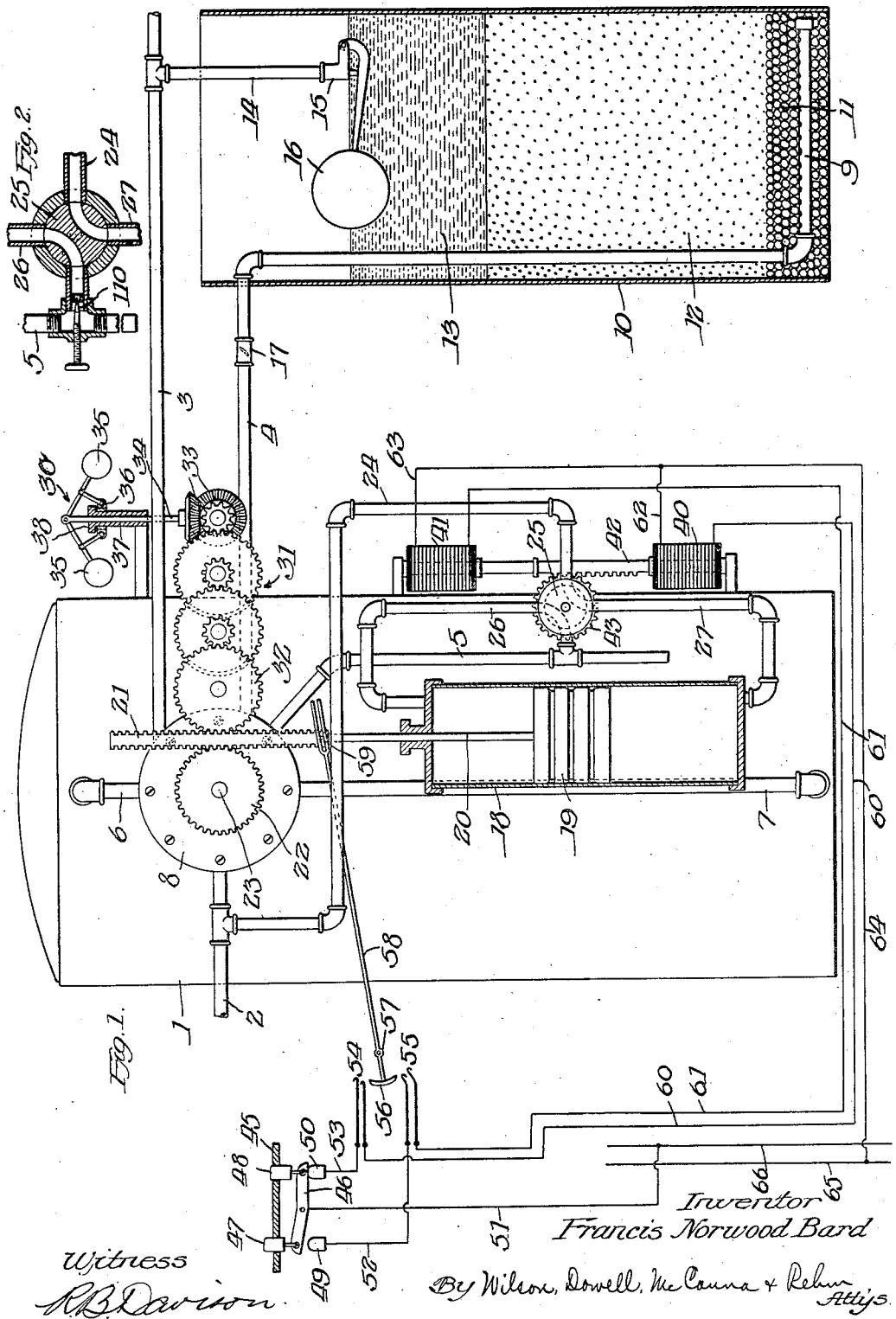
Witness
R. B. Davison
Inventor
Francis Norwood Bard
By Wilson, Dowell, McCanna & Rehm
Attys.

Feb. 23, 1937.  F. N. BARD  2,071,997
WATER SOFTENING APPARATUS
Filed July 6, 1931   5 Sheets-Sheet 2
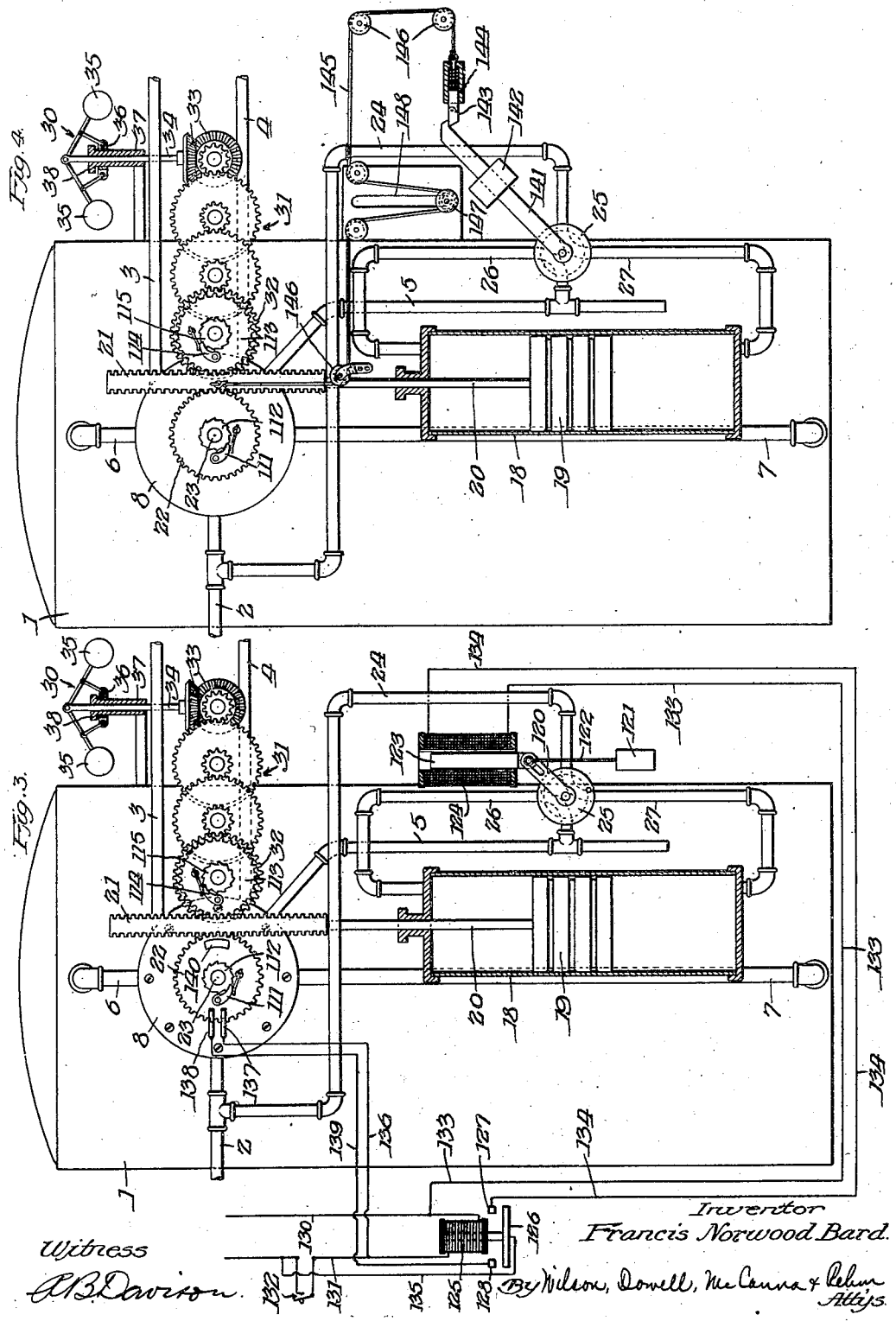
Witness
A. B. Davison
Inventor
Francis Norwood Bard.
By Wilson, Dowell, McCanna & Pelun
Attys.

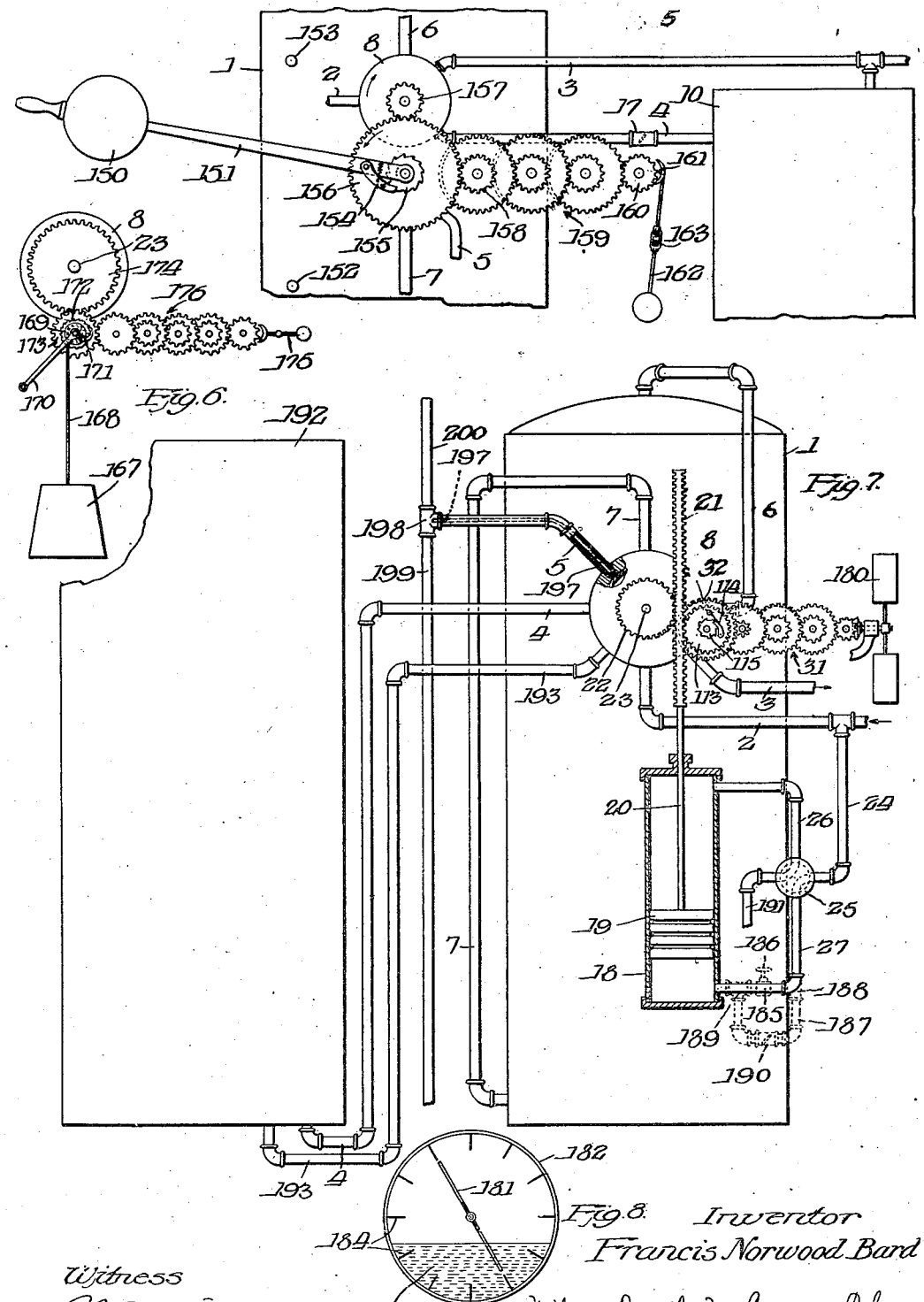

Feb. 23, 1937.    F. N. BARD    2,071,997
WATER SOFTENING APPARATUS
Filed July 6, 1931    5 Sheets-Sheet 4
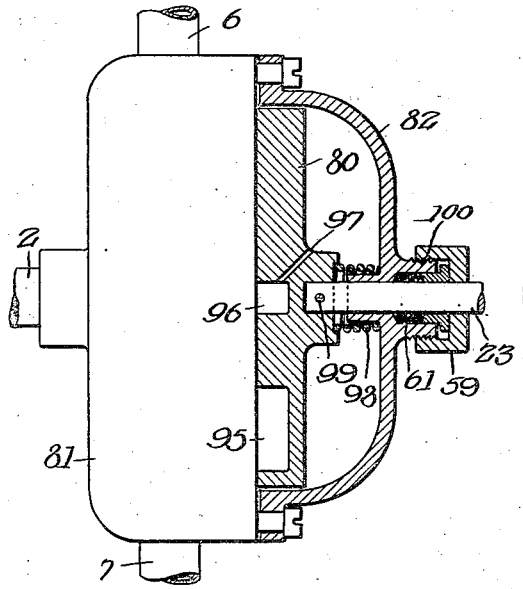
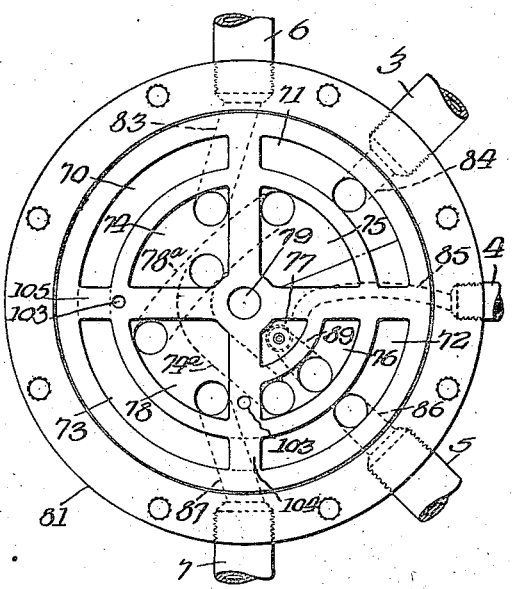
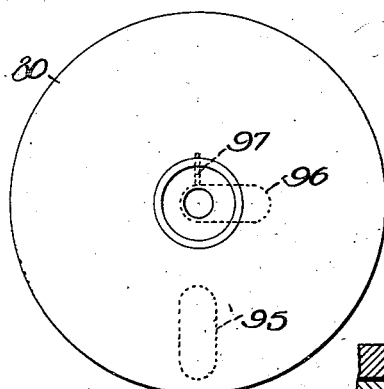
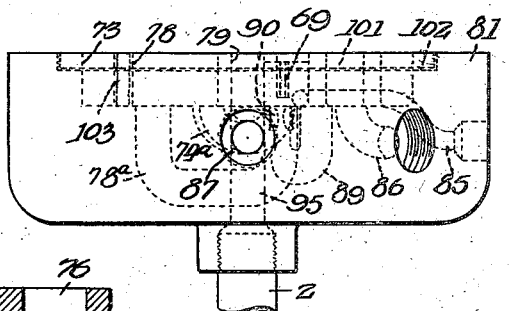
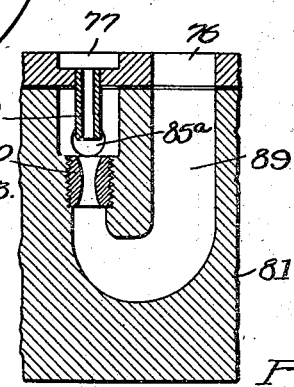
Inventor
Francis Norwood Bard

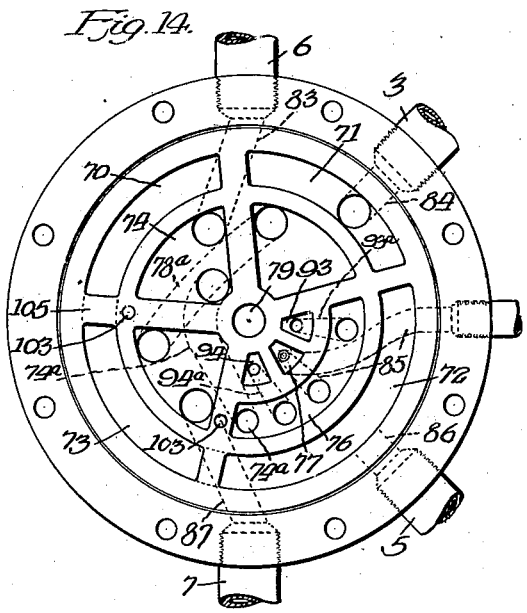
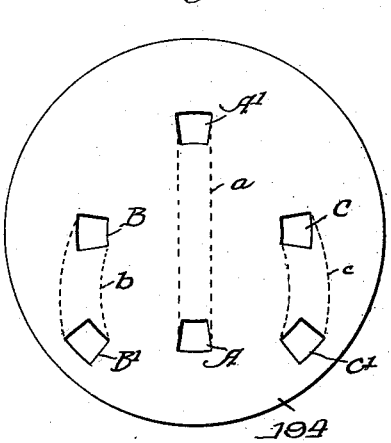
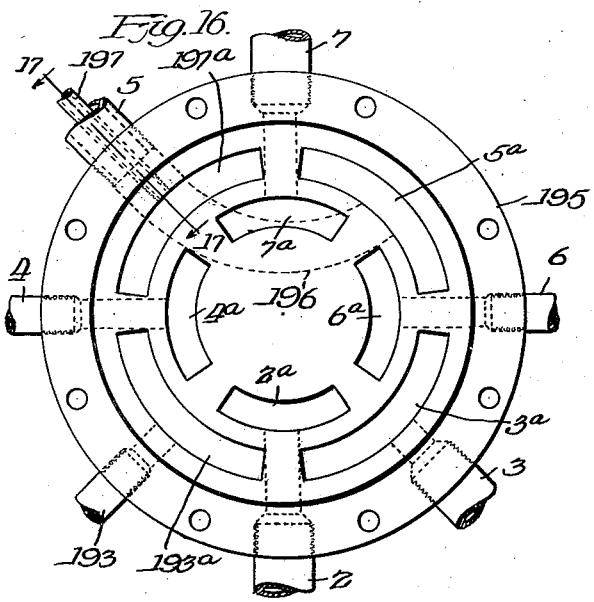
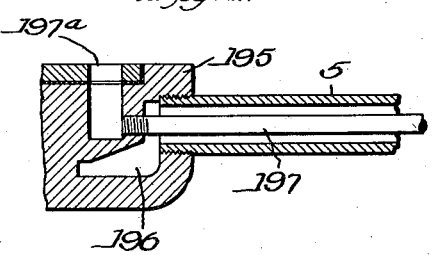

Patented Feb. 23, 1937

2,071,997

UNITED STATES PATENT OFFICE 2,071,997

WATER SOFTENING APPARATUS

Francis Norwood Bard, Highland Park, Ill., assignor, by mesne assignments, to The Permutit Company (1934), Wilmington, Del., a corporation of Delaware Application July 6, 1931, Serial No. 548,744

11 Claims. (Cl. 210—24)

This invention relates to water softening apparatus, and more particularly to the organization of mechanism including valves by which to operate a base-exchange water softener as required for its several functions.

The object of the invention is to provide water softening apparatus with improved mechanism of the class which when set into action will operate automatically to cause the softener to perform its functions other than normal, in due order, and then to resume the normal softening operation.

For explanation of the invention, reference is made to the accompanying drawings, wherein:

Fig. 1 represents a side elevation partly in section of one practicable form of water softening apparatus embodying the invention, with electrical control equipment represented diagrammatically.

Fig. 2 is a detail view of the starting valve of the apparatus of Fig. 1 in association with a different type of governing means from that embodied in the apparatus shown in Fig. 1.

Fig. 3 is a side view partly in section of another apparatus of the same general character as that illustrated in Fig. 1, showing electrical equipment diagrammatically.

Fig. 4 is a similar view representing apparatus without electrical control equipment but having an automatic resetting means whereby after each operation of the mechanism, initiated in this instance by manually opening a starting valve, the mechanism will be in readiness for a subsequent like operation.

Fig. 5 is a partial side elevation of another form of apparatus embodying features of the invention.

Fig. 6 represents another form of mechanism of the general type embodied in Fig. 5.

Fig. 7 is a side elevation partly in section of another apparatus embodying the invention.

Fig. 8 is a detail view of another form of governor of the general type embodied in Fig. 7.

Figs. 9, 10, 11, 12 and 13 represent one suitable rotor valve for use in the illustrative apparatus.

Fig. 9 is a view partly in elevation and partly in section of the valve.

Fig. 10 is a face view of the valve seat.

Fig. 11 is a plan view of the valve rotor, represented in this instance by a disc type rotary valve member.

Fig. 12 is a side elevation of the stationary member or valve body, indicating certain passages by dotted lines.

Fig. 13 is a detail section taken on a radial line through the injector port 69 of Fig. 10.

Fig. 14 is a view similar to Fig. 10 showing a modification of the valve seat for a different circulation which is desired in some instances.

Figs. 15, 16 and 17 represent another form of rotor valve suitable for the purpose of the present invention, and more particularly adapted for the apparatus shown in Fig. 7.

Fig. 15 is a face view of the rotary valve disc.

Fig. 16 is a face view of the valve seat.

Fig. 17 is a detail section taken on a radial line through the pipe 197 of Fig. 16.

Fig. 18 is a sectional view of the valve plate of Figs. 9 to 13.

In the drawings, 1 denotes a softening tank or container for base-exchange material, hereinafter referred to as the softener.

A circulation system for the softener is represented by the hard water supply pipe 2 in connection with a source of water under pressure, the pipe 3 for delivering softened water to service, the pipe 4 for introducing brine or regenerating solution to the softener for the regenerating operation, a drain pipe 5 through which the softener discharges during its operations other than normal, and valve means controlling the connections of said pipes with the softener as required for the different functions of the softener.

In the several embodiments of the invention shown, the valve means are contained in a single case 8 connected with the aforesaid pipes and with the opposite ends of the softener through the pipes 6 and 7.

When the softener is in normal operation, water flows from the supply pipe 2 through the softener to the soft water delivery pipe 3, and when the softener is in regeneration brine is drawn from the brine tank 10 by the pipe 4 and passed through the softener and discharged to the drain pipe 5, after which water for flushing is passed through the softener and discharged to the drain pipe.

In Fig. 1, there is shown for example an open brine tank 10 having a bottom gravel bed 11, a body of salt 12, and reserve water 13 above the salt. The brine pipe 4 draws brine from the bottom of the tank through the outlet distributor 9 embedded in the gravel bed. The brine tank is supplied with water from the soft water line through the pipe 14 controlled by valve 15 operated by a float 16 to close said valve when the water is at a predetermined level.

Referring now to Fig. 1, the valve means for the softener is represented by a multi-ported valve 8 of the rotor type, normally connecting the softener for the normal softening operation and adapted in one revolution of the rotor to change the connections successively as required for the regenerating cycle, i. e. the cycle of operations involved in passing the softener from normal operation through the regenerating operation and other operation or operations incidental thereto and back to normal operation.

The valve for this purpose may be, for example, of the type shown in Figs. 9 to 13, which during successive phases of rotation of the valve rotor establishes in order connections for the flows other than normal, while the flow connections for the normal softening operation are established in a certain normal position of the valve.

The specific valve shown in Figs. 9 to 13, hereinafter described, is adapted particularly for a water softener of the conventional downflow type in which the successive steps of reconditioning, or operations other than normal involved in the regenerating cycle, comprise backwashing, regeneration and flushing.

Means for operating the valve is represented by a hydraulic cylinder 18 whose piston 19 is suitably connected with the valve as, for example, by having its piston rod 20 provided with a rack bar 21 in mesh with a gear 22 on the valve shaft 23.

Water under pressure is admitted to the cylinder from the supply line 2 via the pipe 24 and valve 25 adapted for connecting said pipe 24 with either end of the cylinder while connecting the opposite end of the cylinder with the drain. Said valve 25 is shown in this instance as a 4-way cock which in one position connects the pipe 24 through the branch pipe 26 with the upper end of the power cylinder while connecting the lower end of the cylinder through the branch pipe 27 with the drain pipe 5. In its reversed position the cock reverses the connections.

The particular apparatus illustrated in Fig. 1 is designed to operate the valve to cause the aforesaid cycle of operations of the softener during each stroke of the piston, i. e. during the upstroke and again during the downstroke, which accordingly will require a valve that will function the same in either direction of rotation of the valve rotor.

Duration of the regenerating cycle and of the respective operations involved in that cycle is dependent upon the rate of rotation of the valve rotor, which is controlled by a means serving to retard the action of the hydraulic motor so as to cause it to operate the valve slowly, for instance to make one complete revolution in twenty to thirty minutes, according to the time required for the regeneration and the other operation or operations connected with regeneration.

Such controlling means is represented in this instance by a ball-type governor 30 connected with the piston rod through a high speed gear train 31. The rack bar 21, toothed on one side to mesh with the valve operating gear 22, is also toothed on the opposite side to mesh with the first gear 32 of said gear train, which communicates motion at relatively high speed through the beveled gearing 33 to the governor shaft 34 whose pivoted arms carrying the fly balls or weights 35 are connected to the sliding collar 36 on the shaft bearing 37. When the hydraulic or power cylinder is operated, the relatively high speed communicated to the governor causes its balls to fly out by centrifugal force, thereby drawing the sliding collar 36 against the fixed collar 38, creating friction and exerting a braking action on the piston such that the rotation of the valve rotor is caused to consume the necessary period of from twenty to sixty minutes required. The rate of motion will be steady, since any increase would immediately be communicated to the governor with corresponding increase of braking action, while any decrease with accompanying release of braking action would immediately be responded to by the motor.

From the foregoing, it will be observed that the apparatus provides for an application of power for one operation of the softening apparatus, to cause the regenerating cycle or performance in due order of the functions of the softener other than normal and resumption of normal operation, and for a stabilizing control of the power exerted so as to cause it to be exerted steadily through a desired period of time sufficient for the purpose.

In each case power is obtained from expending, in a power appliance, static mechanical potential energy; that is, energy such as is obtained from the static pressure of a head of water, or from a slowly descending weight. The advantage of using devices making use of this kind of energy is that the power appliance is always ready to start directly upon release of the energy. A gasoline engine must be got up to speed before power is taken from it, and an electric motor does not readily start at full speed and full load, but a weight or water pressure operated device is always ready to start directly upon releasing the weight or turning on a valve controlling the water pressure. This makes for considerable simplification of apparatus. Falling weights and hydraulic cylinders, as I use them in providing power for rotating the valve, have the additional advantage that they are better adapted for turning a valve in slow, continuous rotation through a revolution or so, than are electric motors, which are essentially high speed power devices, and which require considerable gearing down for slow motion work.

Assume, for example, that the softener in Fig. 1 is of the conventional downflow type and operated with a valve of the general character shown in Figs. 9 to 13, which will normally connect the softener for a downflow therethrough to the service connection or soft water pipe 3 and which during a phase of one rotation in either direction from its normal position will connect the softener for a reverse flow for backwashing, in another phase will connect the same for flowing brine through the softener to the drain for regeneration, and in still another phase of such rotation will connect the softener for a flow of water therethrough to the drain for the cleansing or flushing operation. During the normal softening operation, the starting valve or cock 25 being in either of its positions, the piston 19 is in its corresponding extreme position, being so held by the water under pressure. For instance, assume that the cock 25 is in position to connect the pressure pipe 24 with the upper end of the cylinder, having been thrown to that position for a preceding regenerating operation.

Now assume that the softener has been operating for a sufficiently long period for softening water, so that its base-exchange material has become exhausted or is approaching a state of exhaustion of its softening capability, and that it is desired to regenerate. To start the apparatus, the cock 25 is turned to its reverse position, which in the example assumed would be its position for admitting hydraulic pressure to the underside of the piston while connecting the upper end of the cylinder for the exhaust action to the drain. The piston 19 is thereupon moved upward at the slow speed permitted by the governor 30 which when set into high speed action by the movement of the piston exerts a retarding action as before explained. Thus the valve rotor is slowly turned through one complete revolution, causing the softener to pass from normal operation, through the backwashing, regenerating and flushing operations, and to resume the normal softening operation when the valve completes its revolution.

For remote electrical control, to initiate regeneration when desired by the operation of a suitable switch, the following described means is diagrammatically shown, for example. The starting cock 25 is adapted to be operated by solenoids 40 and 41 whose cores are connected to a rack bar 42 meshing with a gear 43 on the rotary plug of the cock or an axial stud projecting therefrom. The solenoid 40 when energized will cause the cock to turn to one position, and the solenoid 41 when energized will cause it to turn reversely to the other position. Electric circuits controlled by a push plug switch are provided, whereby when the piston 19 is at either extreme position the proper solenoid can be energized to reverse the position of the cock and thus cause operation of the motor, and when the piston moves to its other position the circuit is automatically broken so as to de-energize the solenoid. In the electrical diagram shown in connection with Fig. 1, 45 indicates the wall plate of a switch 46 of the type having two push plugs 47 and 48. In this well known type of switch, when one plug is pushed in, the other is pushed out, and the switch has a snap action whereby it remains in either position until the protruding plug is pushed in. The switch, connected by the wire 51 with one of the main wires 66, controls contacts 49 and 50. The contact 49 is connected by wire 52 with one of a pair of contacts 55. The contact 50 is connected by wire 53 with one of a pair of contacts 54. The other contacts of each pair 54 and 55 are respectively connected by the wires 60 and 61 with corresponding terminals of the solenoids 40 and 41, whose other terminals are respectively connected by the wires 62 and 63 and by wire 64 with the other main wire 65. The two pairs of contacts 54 and 55 are controlled by a switch 56 operated by a lever 58 fulcrumed at 57 and actuated by the piston rod, said lever having a slotted end engaging a stud 59 on said piston rod 20. When the piston is in either of its positions, the switch 56 bridges one pair of contacts 54 or 55, as the case may be. For instance, assume that at the end of the softening operation, the piston is in its upper position, in which case the switch 56 bridges the contacts 55. When it is desired to regenerate, the operator pushes in the push button 47. This closes a circuit from line wire 66 through wire 51, switch 46, contact 49, wire 52, contacts 55, wire 61, solenoid 41, wires 63 and 64 to the other line wire 65, thereby energizing said solenoid to reverse the position of the cock 25, so as to admit power to the upper end of the cylinder and connect its lower end for exhaustion. The piston 19 therefor descends slowly as before explained, operating the water softener valve through one complete revolution, and during this movement of the piston the switch 56 leaves the contacts 55, thereby breaking the circuit and de-energizing the solenoid 41. When the piston reaches its lowermost position, the switch 56 will bridge the contacts 54, and since at this time the push button 47 is in and the push button 48 out, the apparatus is ready for a subsequent initiation of regeneration, after another water softening run of the softener. When it again becomes necessary to regenerate, the operator pushes the button 48, establishing a circuit through the wires 66, 51, contact 50, wire 53, contacts 54, wire 60, solenoid 40, wires 62, 64 to the other line wire 65, thus energizing the solenoid 40 to reverse the position of the cock, with consequent admission of pressure to the lower end of the cylinder and connection of its upper end to the drain, so that the piston is caused to move slowly upward and again turn the valve through one complete revolution, though in this instance in the opposite direction from that in the former instance.

The electrical initiating means described, while controlled by a push plug switch, will be understood as exemplifying means which may be under control of any suitable switch to be actuated either manually or automatically, as for instance by an automatic time switch or clock or pursuant to a predetermined flow of water through the softener, for which purpose a switch controlled by a flow meter may be used, or in response to a condition of the softener requiring regeneration, for which purpose a switch controlled by the electrical conductivity of the effluent water may be used; such methods of control being within the present knowledge of the art and therefore unnecessary to be described herein more particularly.

The foregoing description with reference to Fig. 1 is predicated upon an apparatus employing a rotor valve which during one complete revolution in either direction successively establishes in proper order and for proper periods the flow connections required for the operations of the softener other than normal and re-establishes the connections for the normal softening operation when the valve is returned to its original position. As before indicated, Figs. 9 to 13 represent one practicable type of valve for this purpose, designed more particularly for a downflow softener in which the regenerating cycle includes backwashing. It will be understood however that this is exemplary. By an appropriate gear reduction it would be possible, for instance, to rotate the valve rotor so slowly as to make only a half revolution per cycle, in which event the valve would have to be designed so as to establish the different flow connections in order during a half of a revolution, and to establish the normal flow connections in either of two positions 180° apart.

The specific valve of Figs. 9 to 13 comprises a rotary disc-type valve member 80 and ported seat therefor provided by the valve body 81. Referring to Figs. 10 and 12, certain of the ports communicate through cored passages in the valve body with the pipes of the circulating system, and certain of the seat ports communicate with one another through other cored passages in the valve body. The hard water supply 2 communicates through the passage 95 with the central port 79 of the valve seat. The pipe 7 connected with the bottom of the softener communicates through the passage 87 with the quadrantal port 78 which is also in communication through the cored passage 78$^a$ with the diametrically opposite quadrantal port 75. The pipe 6 connected to the top of the softener communicates through the passage 83 with the quadrantal port 74 which is also in communication through the passage 74$^a$ with the diametrically opposite segmental port 76. The soft water delivery pipe 3 communicates through the passage 84 with the segmental port 71. The brine pipe 4 communicates through the passage 85 with the space shown in Fig. 13 into which extends the injector nozzle 69 leading from the small quadrantal port 77. In Fig. 13 the delivery opening from the brine passage is indicated at 85ª. The tubular port or nozzle 69 cooperates with the throat member 90 to provide an injector (or ejector according to one's view) by which water flowing from the port 77 through the nozzle 69 draws brine from the delivery opening 85ª and forces the mixture of water and brine through the throat member 90 and thence through passage 89, port 76, and other ports as hereinafter explained. The drain pipe 5 communicates through the passage 86 with the three segmental ports 72, 73 and 70, which although shown as three separate ports are in fact in communication with one another through a continuous segmental passage in the valve body extending three-fourths around the way of the valve. The valve disc or rotor 80 has two face ports provided by recesses 95 and 96. These ports 95 and 96 are arranged radially at right angles to one another, the port 96 extending from the center of the disc a sufficient distance to bridge the central seat port 79 and any adjacent port, and the disc port 95 being located in a position to bridge the larger quadrantal ports and surrounding segmental ports of the valve seat.

When the valve disc is in the normal or softening position, the disc port 96 connects the central hard water inlet port 79 with the seat port 74, while the disc port 95 connects the seat ports 71 and 75. In this position, the water flows from the hard water supply pipe 2 (Fig. 12) through the valve via seat port 79, disc port 96, seat port 74, passage 83 to the pipe 6 and by said pipe 6 to the upper end of the softener and downwardly through the softening material therein and thence out by the pipe 7 and through the valve via the passage 87, seat port 78, passage 78ª, seat port 75, disc port 95 and seat port 71 to the soft delivery pipe 3. As the valve disc rotates in a clockwise direction from its normal position, the disc port 96 will connect the seat ports 79 and 75, while the disc port 95 will connect the seat ports 72 and 76, thereby establishing connections for a reverse flow through the softener to the drain for backwashing. The flow in this instance is from the supply pipe through the central seat port 79, disc port 96, seat port 75, passage 78ª, seat port 78 and passage 87 to the pipe 7 and by said pipe to the bottom of the softener and upwardly through the softener and then out by the pipe 6 and through the valve via passage 83, seat port 74, passage 74ª, seat port 76, disc port 95, seat port 72 and passage 86 to the drain pipe 5. It will be noted that with the valve in the backwash position, unless otherwise provided, the water could flow from seat port 76 through the cored passage 89 to and through the ejector throat 90 and thence out through the passage 85 (Figs. 10 and 13) and through the brine pipe 4 to the brine tank. In order to prevent this, there is provided a check valve 17 (Fig. 1) in the brine pipe, which allows flow of brine only from the brine tank, but not in a direction to the brine tank.

The valve disc in the course of its rotation, after having maintained the connections for backwashing for an appropriate period, will disestablish those connections and establish connections for the regenerating operation, by advancing the disc port 96 so as to connect the seat ports 79 and 77 and the disc port 95 so as to connect the seat ports 73 and 78, and while the last mentioned connections are maintained, during a further phase of rotation of the valve disc, the circulation is as follows: Water under pressure flows from central seat port 79 through disc port 96, seat port 77, injector tube 69 (Fig. 13) past the end 85ª of brine passage 85 through nozzle 90 and passage 89 to seat port 76. The flow of water under pressure past the small end 85ª of the passage 85 induces a suction therein and consequent withdrawal of brine through the pipe 4 from the open brine tank 10; whereby and with the water from the nozzle 69 the salt brine is forced via the passage 89, seat port 76, passage 74ª, seat port 74 and passage 83 to the pipe 6, and by said pipe 6 to the top of the softening tank and then downwardly through the softener and back by the pipe 7 and through the valve via seat port 78, disc port 95, seat port 73, and passage 86 to the drain, it being remembered that seat ports 72, 73, 70 are in communication through a continuous segmental passage in the valve body.

Continuing its rotation, the valve disc, after having maintained connections for flow of brine from the brine tank through the softener for an appropriate period, will come into position so that the disc port 96 will connect the seat ports 79 and 78 while the disc port 95 will connect the seat ports 74 and 70, thereby permitting a flow of water from the supply line through the valve via central seat port 79, disc port 96, seat port 78 and passage 87 to the pipe 7 and by said pipe to the bottom of the softener and thence upwardly through the softening material and out from the top of the softener by the pipe 6 and through the valve via passage 83, seat port 74, disc port 95, seat port 70 and passage 86 to the drain pipe 5. By this flow the brine is displaced upwardly from the softening material, and the softening material and interior of the softening tank are cleansed or washed until the water discharged to the drain is substantially free of brine.

The last operation, referred to as flushing, continues until the valve disc in continued rotation moves the disc ports from seat ports through which the flushing connections are established, after which the valve disc will return to its original position, re-establishing the connections for the normal softening operation.

In the preceding description of the valve, a clockwise direction of rotation has been assumed. In a counterclockwise rotation the operations will be the same for, although the valve disc in rotating in a counterclockwise direction will make the described connections in reverse order, they will be appropriate for the successive functions of the softener. In other words, while the valve in moving in a counterclockwise direction is making the connections previously described for the flushing operation, such connections will be utilized for the preliminary backwashing, after which the brine flow through the softener will take place as before, and while the valve is making the connections previously described for backwashing the flow for flushing will take place through these connections.

Thus a valve such as described is suitable either for a construction, as in Fig. 1, where the valve is rotated in opposite directions in its alternate operations, or for one such as will presently be described in which the valve in every operation is always rotated in the same direction.

By a modification of the ported valve seat shown in Fig. 14, a unique improvement in circulation may be made which is desirable for some cases. This valve seat of Fig. 14 differs from that of Fig. 10 by having a pair of additional ports 93 and 94 arranged at opposite sides of the port 77 and respectively communicating through the passages 93ª and 94ª with the passage 76. The remaining ports of Fig. 14 correspond to those of Fig. 10, except that they are of different dimensions, and they are for clarity designated by the same reference numerals. With the arrangement shown in Fig. 14, assuming for example a clockwise direction of rotation of the valve disc, after the backwashing operation the disc in its continued rotation connects the central port 79 successively with the ports 93, 77 and 94, all of which communicate with the segmental port 76 which as already explained communicates through passage 74ª with the seat port 74. The result in thus having the disc port 95 connect the port 76 successively with the three ports 93, 77, 94 instead of with just the one port 77 as in Fig. 10, is that a downflow of water through the softener takes place before and after the brine flow. The downflow of water preceding the regeneration has the added advantage of slightly packing the bed of zeolites or base-exchange material after its agitation by backwashing, so that a better distribution of brine results in the ensuing brine flow; while the downflow of water after the brine flow gives a downward rinse or flushing followed by the upward flushing already described. This flushing in opposite directions is desirable in some cases.

Referring now to certain further structural features of the valve, it will be observed that the valve rotor, represented in this instance by the disc 80, is enchambered in a case provided by the ported valve body 81 and cap 82 which is bolted to the valve body with an interposed gasket to provide a fluid-tight joint. By a passage 97 connecting the disc port with the chamber within the cap, water under pressure is permitted to get above the rotor and exert a force to hold it firmly seated at all times. A spring 98 compressed between the cap and rotor assists to hold the rotor seated; however the hydraulic pressure is depended upon principally for making a tight joint between the cooperating valve members. The valve shaft 23, extending through a suitably packed stuffing box 100 to prevent leakage, has a driving connection with the valve rotor either by a key or pin, as indicated at 99, adapted to be sheared in case the valve rotor should stick too hard to its seat, so as to avoid damage to the operating gearing.

The ported valve seat previously described is provided in this instance by the removable valve plate 101 fitted in a circular opening therefor in the valve body against a gasket 102 and held in position by dowel pins 103 which are so arranged that it would be impossible to insert the valve plate in a wrong position. By this construction if the surface of the valve plate which is in contact with the rotor should become worn or scored, a new valve plate can be inserted, together with a new valve disc if necessary.

The actual face of the valve body against which the valve plate is seated is ported identically with the plate except at the points 104 and 105 which are solid in the valve plate, merely to reinforce this plate, and bridge over a continuous segmental port in the valve body, so that, as already explained, the seat ports 72, 73, 70 are in communication as though they were one continuous port extending three-quarters of the way around the valve. The gasket 102 interposed between the valve body and valve plate is of course ported to correspond with the valve plate ports.

Referring again to Fig. 1, another means for timing the operation of the apparatus, in lieu of the high speed gear train and governer shown in Fig. 1, would be to exhaust the cylinder through an orifice so restricted that each stroke of the piston would require from twenty to sixty minutes, depending upon the amount of time necessary to accomplish the proper regeneration, according to the particular zeolites or water-softening mineral used. For example, as shown in Fig. 2, with the cock 25 in either position for admitting water under pressure to one end of the cylinder, the water from the other or drain end would have to escape through a small orifice controlled by the needle valve 110 whereby the restriction of the orifice may be adjusted to regulate the timing of the apparatus as desired.

Fig. 3 shows an apparatus generally similar to that of Fig. 1 but differing specifically in that the valve controlling the circulation through the softener is operated only during the upstroke of the motor piston. In this case the valve rotates in the same direction for all operations. The valve already described may be employed, or there may be used a valve of the type hereinafter described with reference to Figs. 15 and 17.

In Fig. 3, the valve operating gear 22 is loose on the valve shaft and adapted to be connected with the shaft by a ratchet device when the gear is rotated in a counterclockwise direction by the upward movement of the piston.

As shown, said gear 22 carries a spring-pressed pawl 111 engaging a ratchet wheel 112 fast on the shaft, the arrangement being such that when the gear is rotated in a clockwise direction by the downward movement of the piston the pawl slips over the ratchet teeth. The first gear 32 of the high speed gear train 31 is not in mesh with the rack bar 21 but is adapted to be operatively connected therewith on the upstroke of the piston through a ratchet device associated with a loose gear 113 in mesh with the rack bar. The gear 113 is loose on the shaft of the gear 32 and carries a spring-pressed pawl 114 coacting with the ratchet wheel 115 fast on said shaft of the gear 32, the arrangement being such that the pawl slips over the ratchet teeth when the gear 113 is rotated in a counterclockwise direction by the downward movement of the rack bar.

From the foregoing description of Fig. 3, it will be seen that when the starting valve or cock 25 is turned to position to admit pressure to the lower end of the power cylinder, the piston will move upward at a slow uniform speed under control of the governor 30, as previously explained with reference to Fig. 1, thereby turning the rotary member of the valve 8 through one complete revolution so as to cause the performance of the regenerating cycle; while on the downward stroke of the piston, which occurs when the position of the cock 25 is reversed, the rack bar 21 simply turns the gears 22 and 32 inoperatively or as idlers.

As shown in Fig. 3, the cock 25 has an operating lever 120 having a pin and slot connection with the core 123 of a solenoid 124, whereby the solenoid when energized will operate the cock to connect the lower end of the cylinder 18 for admission of pressure and the upper end for exhaust. The solenoid is energized through a relay magnet whose winding is indicated at 125 and whose armature 126 is adapted to bridge the contacts 127 and 128. The relay winding is connected in a normally open circuit comprising the wires 130 and 131, and having a push button switch 132.

Upon closing the switch 132, a circuit is closed through wires 130, 131 and winding 125 of the relay magnet, which being energized attracts its armature 126, thereby bridging the contacts 127 and 128. This closes a circuit from wire 130 through wire 133, solenoid 124, wire 134, contact 127, armature 126 and wire 135, the wire 135 being connected to the line wire 131 around the push button switch. Thus the solenoid 124 is energized to attract its core and operate the starting valve or cock 25 to the starting position. When the push button switch is released, thereby breaking the circuit therethrough, nevertheless the relay magnet and consequently the solenoid 124 both remain energized, there being a circuit from the line wire 130 through the relay winding 125, wire 136, contacts 137, 138, wire 139, contact 128, relay armature 126 and wire 135 to the other line wire 131. The contacts 137 and 138 of the wires 136 and 139 may bear on the valve operating gear 22, or if preferred they may bear on an insulated strip on the rack bar 21 of sufficient length to maintain the electrical connection between the contacts 137 and 138 during the upward stroke of the piston. Thus the solenoid 124 remains energized while the piston and rack bar are moving upwardly, and until the valve controlling the circulation through the softener is turned through one complete revolution or from normal to normal position. When the valve is returned to the normal position, the electrical connection between the contacts 137 and 138 is broken; for example the gear 122 may have an insert 140 of carbon or insulation material which will be brought under the contact 137 when the valve is in the normal position. Thus upon completion of the upward stroke of the piston, during which the valve is turned from normal position through one complete revolution back to normal position, the circuit is broken through the relay and consequently through the solenoid 124, which being thus deenergized releases its core, and by the weight 121 the cock 25 is operated to reverse its position, connecting the upper end of the cylinder for admission of pressure and the lower end for exhaust, so that the piston is allowed to descend to its lower position.

Fig. 4 shows an operating mechanism similar to that of Fig. 3 as to mechanical features, but without electrical control means, and in which the cock 25 is manually operated to set the apparatus into action, while an automatic means is provided to reverse the position of the cock after the completion of the upstroke of the motor piston, so as to reset the apparatus for a subsequent initiation of regeneration by one manual operation of the cock. In other words the operator has to turn the cock only to start the operation, and does not have to reverse its position.

In Fig. 4 the cock is provided with a weighted operating lever 141 which normally holds the cock in position to admit pressure to the upper end of the cylinder and exhaust the lower end, so that the piston is normally at the lower end of the cylinder. To start the operation, the operator lifts the lever 141 to the position shown, thereby turning the cock to position to admit pressure to the lower end of the cylinder and exhaust the upper end. As the lever 141 is swung upwardly, its free end trips past a pivoted catch 143 which holds the lever in its raised position, thereby maintaining the cock in position to admit pressure to the lower end of the cylinder until the completion of the upstroke of the piston. During this stroke the valve controlling the circulation through the softener is slowly turned from normal position through its phases for the regenerating cycle and back to normal position, as previously explained. The catch 143 is pivoted to a slide 144 which is connected by a pull cord 145 passing around guide pulleys 146 and connected to the piston rod 20. When the piston completes its upstroke, thereby restoring the valve 8 to position for the normal softening operation, the cord 145 retracts the slide 144 so as to withdraw the catch 143 from under the end of the lever 141, whereupon by action of the weight 142 the cock 25 is turned to its reverse or normal position so as to admit pressure to the upper end of the cylinder and exhaust the lower end, and thus allow the piston to descend. A slack take-up for the pull cord 145 is provided by the pulley 147 whose trunnions are movable up and down in a slotted guide 148. When the piston reaches the limit of its upstroke, the pulley 147 is raised to the extreme of its upward movement, and the pull cord is placed under tension to draw the slide 144, which slide is spring-pressed to its forward position.

Fig. 5 represents an apparatus embodying a mechanical motive means, the power for operating the apparatus being furnished in this instance by a weight 150 carried by a lever 151. Normally the weighted lever rests against the stop 152, in which position of the lever the valve controlling the circulation system of the softener is in position for the softening operation. To start the regenerating cycle, the weight 150 is raised by lifting the lever to a position against the stop 153. These stops 152 and 153 typify suitable indexing means for limiting the range of movement of the prime moving means furnishing the power. In lifting the lever to the stop 153, the pawl 154 carried by the lever rides idly over the teeth of the ratchet gear 155 fast to the gear 156. Thus the lifting of the weighted lever does not turn the gear, and therefore no movement is imparted to the valve. The lever having been raised to the stop 153 is released and allowed to descend under the action of the weight, in which movement the gear 156 is driven through the pawl 154 engaging the ratchet gear. The valve in the case 8 is thereby turned through one revolution, being driven by the gear 156 in mesh with the gear 157 on the valve shaft 23. For governing the rate and duration of the operation, the gear 156 is in mesh with the first gear 158 of a high speed gear train 159 whose last gear or pinion 160 is engaged by the pallet 161 of a pendulum escapement. Thus the rate of lowering of the weight 150 and consequently the duration of the successive operations involved in the regenerating cycle is controlled by the pendulum 162, whose pallet allows movement of the gear 160 by escapement of tooth by tooth from the pallet as the pendulum swings. In this instance the piston and valve move with a slow uniform intermittent movement instead of with the uniform continuous movement provided by the mechanisms shown in the preceding figures. By adjusting the length of the pendulum in Fig 5, the time for the complete regenerating cycle may be controlled as desired. For this purpose the pendulum is shown provided with a turn buckle 163.

Fig. 6 shows a mechanism the same in principle as that shown in Fig. 4, except that instead of a weighted lever the weight 167 is suspended by a cable 168 from a drum 169 on which the cable can be wound by turning the drum by means of the crank 170 to raise the weight to the position for expending its energy to operate the apparatus. In winding up the cable, the pawl 171 on the drum rides idly over the teeth of the ratchet gear 172 fast to the gear 173 in mesh with the valve-shaft driving gear 174. Having been raised to a predetermined point, as may be determined by any suitable indexing means, the weight is released and allowed to descend to a suitable rest (not shown), during which descent the gearing is driven by the reverse rotation of the drum through the pawl and ratchet device. The rate of descent is controlled by the same character of mechanism as in Fig. 5 except that in this instance a balance staff 175 is substituted for the pendulum, this balance staff having an escapement pallet coacting with the last gear of the high speed gear 176 driven from the gear 173.

In each of the apparatus of Figs. 3, 4, 5 and 6, the water softener valve is driven in one direction only, and during the rotation of the valve the number and sequence of operations may be as desired, according to the directions of flow and number of steps desired in the regenerating cycle. In any of these apparatus the valve shown in Figs. 9 to 13 or the valve hereinafter described with reference to Figs. 15 to 17 may be employed, or there may be employed any other appropriate valve.

Fig. 7 represents an apparatus in which the power appliance and valve driving and controlling mechanism are of the same character as in Fig. 3, modified however in that the valve is quickly turned in a reverse direction on the upstroke of the motor piston and slowly turned to change the connections of the softener in the order required for the regenerating cycle on the downstroke of the piston. The valve, depending upon its design, may be rotated through a complete revolution during each stroke of the piston, or if it be designed to establish normal flow connections in either of two different positions it may be rotated through less than a complete revolution. For instance if the valve were designed to establish normal flow connections in either of two positions at an angular distance apart of say 270°, then by appropriate gear ratios the valve could be caused to turn back 270° on the upstroke of the piston and on the immediately succeeding slow downstroke would rotate slowly to its original position. Or, assuming that the valve were designed to be in position for the softening operation only when the piston is in its lowest position, and to be in position to start regeneration when the piston is in its upper extreme position, the valve could likewise be given a partial backward rotation during the quick upstroke and a slow rotation in a direction to resume its normal position on the slow downstroke.

The parts of Fig. 7 corresponding to those of Fig. 3 are correspondingly designated in Fig. 7. As shown in that figure, the valve operating gear 22 in mesh with the rack bar 21 is fast on the valve shaft, so that the valve will turn in opposite directions on the up and down strokes of the piston, while on the other hand the rack bar is not in mesh with the first gear 32 of the high speed gear train 31 but is connected therewith as in Fig. 3 through the loose gear 113 carrying the pawl 114 coacting with the ratchet gear 115 fast with the gear 32, the arrangement being such that on the upstroke of the piston the pawl rides idly over the ratchet teeth, so that there will be no motion imparted to the gear train 31, while on the downstroke of the piston the gear train is driven from the rack bar through the gear 113 and pawl and ratchet device, thus controlling the rate and duration of operation on the downstroke.

The controlling mechanism of Fig. 7 embodies a different species of governor from that of Fig. 3, the governor of Fig. 7 consisting of a paddle wheel 180, which revolving at high velocity exerts braking action on the piston or valve operating means through the air resistance to the blades of the wheel.

An alternative form of governor is shown in Fig. 8, comprising a paddle wheel 181 revolving in a case 182 containing a body of preferably viscous liquid 183 into which the blades of the revolving paddle wheel dip. The case 182 may have interiorly projecting baffles 184 to resist any whirling motion of the liquid body. Also these baffles resist whirling motions of the air, and thus increase the resistance of rotation of the paddle wheel.

In lieu of the governor mechanism of Fig. 7, the speed of the piston on its downstroke could be controlled on the same principle as in Fig. 2, i. e. by a very slow exhaust from the upper end of the cylinder. Additional pipe connections for this purpose are indicated by dotted lines at the lower right hand part of Fig. 7. Referring to the dotted line representation, the pipe 27 which connects the pressure supply pipe 24 through the cock 25 with the lower end of the cylinder may have a restriction at 185, which restriction for example may be provided by an orifice controlled by a needle valve 186. A by-pass pipe 187 may be connected to the pipe 27 around the needle valve, as indicated at 188 and 189. The by-pass pipe 187 contains a check valve 190 which operates to permit flow through the by-pass pipe to the lower end of the cylinder but to prevent flow through the by-pass pipe in a reverse direction. Now if the apparatus of Fig. 7 were equipped with the connections represented by dotted lines, then when the cock 25 is turned from its normal position to the reverse position to connect the lower end of the cylinder with the pressure and the upper end to the exhaust pipe 191, the water under pressure will flow freely to the lower end of the cylinder through the by-pass pipe 187, while the upper end of the cylinder will exhaust freely through the pipe 26, cock 25 and waste pipe 191. This upward movement of the piston, as before explained, sets the water softener valve in position for the commencement of the regenerating operation, from which it may be rotated in a clockwise direction as required for the regenerating cycle. With the particular apparatus being described, the operator next turns the cock 25 to its normal position, connecting the upper end of the cylinder with the water pressure line and the lower end of the cylinder to the exhaust pipe. In this position of the cock, the exhaust from the lower end of the cylinder can take place only through the small orifice at 185, since the check valve 190 will prevent any backflow through the by-pass pipe 187. By proper adjustment of the needle valve 186, the orifice controlled thereby may be regulated to restrict the exhaust as desired.

While the foregoing description with reference to Fig. 7 assumes the use of a hand-operated plug 25 which the operator turns to reverse position and then back to normal position in order to start the regeneration, it will be apparent that such a mechanism equipped with electrically operated means operative in response to the closing of the push button switch, or an automatic switch, to turn the cock to its reverse position and back to its normal position when the piston reaches its uppermost position, would be within the general principles explained with reference to Figs. 1, 3 and 4.

If the mechanism of Fig. 7, whether equipped with the gear train 31 and governor 180 or the other controlling means represented by dotted lines, were modified by having the valve operating gear 22 loose on the valve shaft and adapted to be operated by the rack bar 21 only on the downstroke of the piston through a pawl and ratchet connection such as is provided in Fig. 7 for the gear 113, then this apparatus would be substantially in accordance with that of Fig. 3, in that the valve would be rotated for every operation in one direction only, though in this case the rotation would occur on the downstroke of the piston instead of the upstroke as in Fig. 3. In case of the particular modification suggested, the specific electrical controlling means shown in Fig. 3 could be used. With the construction actually shown in Fig. 7, the electrical controlling means of Fig. 1 could be applied.

In Fig. 7, the brine pipe 4 is shown in connection with a closed brine tank 192, or rather in connection with the bottom brine compartment of a Sweeney brine tank which compartment during the regenerating operation is closed and receives water under pressure as from a pipe 193 and discharges an equivalent amount of brine through the brine pipe 4. The Sweeney type of brine tank is disclosed in United States patent to Sweeney No. 1,693,829 of December 4, 1928. Other examples of such brine tanks, which may be employed for the tank 192 shown in Fig. 7, are disclosed in pending applications of Harwood & Griswold, Serial No. 130,806, filed August 23, 1926, Serial No. 158,458, filed January 3, 1927, and Serial No. 347,319, filed March 10, 1929. As explained in said Sweeney patent, and in the applications referred to, the bottom compartment of the brine tank, with which the pipes 4 and 193 are connected, is normally in open communication with a superposed main compartment in which salt is dissolved, whereby concentrated brine is supplied to the bottom brine compartment during the normal operation of the softener, while the brine compartment as aforesaid is closed except during the brine flow, i. e. when water is being circulated through the brine compartment from the pipes 193 to the brine pipe 4.

With the type of brine tank last referred to, it is desirable to employ a valve which in the regenerating period will establish connections for a circulation from the water supply pipe 2 through the closed brine compartment of the brine tank and thence through the softener; and one appropriate valve for this purpose will now be described with reference to Figs. 15 to 17. This valve comprises a ported rotor 194 and ported seat therefor provided by the valve body 195. The rotor may be a disc enchambered as in Fig. 9 and likewise held seated under hydraulic pressure. The ported seat for the rotor may be provided by a separate ported valve plate as explained with reference to Figs. 10 and 12. The construction of the rotor and seat are however very different from those of the previously described valves in respect to the arrangement of ports and passages. The valve seat has eight segmental ports arranged as shown in Fig. 16 which are connected by cored passages in the valve body 195 with the pipes of the circulation system, the connections being as follows: port $2^a$ is connected with the hard water supply pipe 2; port $3^a$ with the soft water delivery pipe 3; port $6^a$ with the pipe 6 leading to the top of the softening tank 1; port $5^a$ with the drain pipe 5 (the passage connecting port $5^a$ with said drain pipe being indicated at 196); port $7^a$ with the pipe 7 leading to the bottom of the softening tank; port $197^a$ with a small pipe 197 extending into the drain pipe 5 (see Fig. 16); port $4^a$ with the brine pipe 4; and port $193^a$ with the pipe 193 for conducting water to the brine tank.

The rotor 194 has six ports, A, $A^1$, B, C, $B^1$, $C^1$, which are connected in pairs by passages in the rotor, the diametrically opposite ports A, $A^1$ being connected by the passage $a$; the port B being connected with the port $B^1$ by the passage $b$, and the port C being connected with the port $C^1$ by the passage $c$.

In the normal or softening position of the valve the rotor ports A, $A^1$, B, C, communicate with the seat ports $2^a$, $7^a$, $6^a$, $4^a$, while the rotor ports $B^1$ and $C^1$ register with the seat ports $3^a$ and $193^a$. In this position of the valve the flow is from the source of water by pipe 2 through the valve via seat port $2^a$, rotor ports A, $a$, $A^1$ and seat port $7^a$ to the pipe 7 and by said pipe to the bottom of the softener and thence upwardly through the softener and out by the pipe 6 and through the valve via the seat port $6^a$, rotor ports B, $b$, $B^1$ and seat port $3^a$ to the soft water delivery pipe 3; the valve and connections in this instance being designed for an upflow of water through the base-exchange material in the normal softening operation.

The valve rotor in the course of its rotation moves its ports off from the particular set of seat ports first mentioned, and brings the rotor ports into communication with a different set of the seat ports, thereby establishing connections for the regenerating operation in which the circulation is as follows: From the supply pipe 2 water flows through the valve via seat port $2^a$, rotor ports B, $b$, $B^1$ and seat port $193^a$ to the pipe 193 leading to the now closed bottom brine compartment of the Sweeney brine tank 192, thereby displacing an equivalent amount of brine which flows through the brine pipe 4 and through the valve via seat port $4^a$, rotor ports A, $a$, $A^1$ and seat port $6^a$ to the pipe 6 connected to the top of the softener tank. After flowing downwardly through the softening material, the spent brine or solution is discharged by the pipe 7 through the valve via seat port $7^a$, rotor ports C, $c$, $C^1$ and seat port $197^a$ to the small pipe 197 enclosed by the drain pipe 5 (Fig. 17).

In its continued rotation, the valve rotor in course of time moves its ports off from the seat ports through which the brine flow took place, and into communication with another set of seat ports, establishing connections for the flushing operation in which the flow is from the water supply 2 through the valve via seat port $2^a$, rotor ports A, $a$, $A^1$ and seat port $7^a$ to and by pipe 7 to and upwardly through the softener and thence from the softener by pipe 6 through the valve via seat port 6ª, rotor ports C, c, C¹ and seat port 5ª to the drain pipe 5.

During the flushing, the bottom brine compartment of the brine tank is in communication with the main salt compartment of the tank. It is desired that the water in the brine tank should be not above a certain level, and the valve of Figs. 15 to 17 embodies provision whereby during the flushing there may be a backflow from the brine tank by the pipe 4 through the valve to the drain, only however if the water in the brine tank is above the desired level and only until it is lowered to the desired level. This flow, while the valve rotor is in the phase of its rotation for the flushing operation, is from pipe 4 through the valve via the seat port 4ª, rotor ports B, b, B¹, seat port 197ª and small pipe 197 enclosed by the drain pipe. The flow referred to takes place only if the water level in the brine tank is above the discharge end of the small pipe 197 and ceases when the water level drops to that of said discharge end. In the particular construction shown in Fig. 7, the said discharge end of the pipe 197 is contained in the connection 198 of the drain pipe 5 to the waste pipe 199 which has a vent 200 extending from said connection to a point above the water level in the brine tank, so that in the flushing operation there can be no siphoning action to bring the level of the water in the brine tank below the discharge end of the small pipe 197.

In the course of the continued rotation of the valve rotor 194, the connections for the flow for flushing are disestablished. During a further phase of rotation, there is a flow of water from the supply pipe 2 through the valve via seat port 2ª, rotor ports C, c, C¹ and seat port 3ª to the service pipe 3, thus by-passing hard water to service during this phase of rotation, and the completion of the rotation brings the valve back to its original position for the circulation of water through the softener to the service pipe.

The respective apparatus herein described may be used mutatis mutandis with the different power appliances, operating and governing means and electrical controlling means described. It will be understood that the invention is not limited to the particular mechanisms selected for illustration, since the invention is susceptible of embodiment in various organizations to suit various different conditions. Moreover it is not indispensable that all the features of the invention be used conjointly as various different features may be advantageously used in various different combinations and sub-combinations.

In the following claims, expressions with reference to connecting pipes or conduits with opposite ends of the water softening tank or container will be understood in a broad sense as signifying that such pipes or conduits are put into communication with the interior of the container so that the flow will be from one pipe through the water softening material to the other pipe. Obviously in the illustrative structures the pipes 6 and 7 instead of being arranged as shown could enter the container at either end or at the center and be connected with the opposite ends through interior pipe extensions. Also in certain types of softeners the inlet and outlet ends of the zeolite bed are at the same end of the container. So in the claims the ends of the container will be understood as signifying the interior parts of the container associated with the receiving and discharge ends of the zeolite bed.

What I claim as my invention, and desire to secure by Letters Patent, is:

1. In a water softening apparatus comprising in combination a container for water softening material, supply conduits for water and regenerating solution, delivery conduits for soft water and waste liquids, different supply and delivery conduits adapted to be connected with opposite ends of the container and a multiport rotary valve adapted upon being rotated slowly and continuously to control the connections of the container with said conduits for stages of regenerating, rinsing and softening, means for operating the valve comprising a power cylinder having a working piston therein operatively connected with said valve and adapted during one stroke of the piston to turn said valve from the softening position through the several regenerating positions and back to softening position, means for supplying fluid under pressure to said cylinder, a starting valve controlling said means, speed increasing mechanism adapted to be put in motion by the rotation of the valve and governing means driven by said speed increasing mechanism and restraining the speed of rotation of the valve to a slow steady rate providing predetermined periods of time for said regenerating and rinsing stages.

2. In a water-softening apparatus comprising, in combination, a container for water-softening material, supply conduits for water and regenerating solution, delivery conduits for soft water and waste liquids, the different supply and delivery conduits being adapted to be connected with the container, rotor valve mechanism controlling the connections of the container with said conduits, a power cylinder, means for admitting pressure to either end of the cylinder while exhausting the other end, said cylinder having a working piston operatively connected with said rotor valve mechanism, the said rotor valve mechanism being operable in either direction and on either stroke of the piston for changing the connections of said container with said conduits in the order required for passing the softener from normal operation through its operations other than normal and back to normal operation, said valve mechanism being thereby adapted to maintain flow connections for different operations of the softener other than normal during different phases of the operation of said valve mechanism by a slow, continuous rotation of the valve mechanism and governing means operated by the piston and restraining the piston to operate said valve mechanism at a slow steady rate appropriate to the time required for the said operations of the softener other than normal.

3. In a regenerative base exchange water softener, automatically controlled regenerating apparatus comprising in combination a rotary multiport control valve including a ported rotor and a plurality of extended interport passages adapted to establish flows for a cycle of several regenerating operations and to maintain said flows upon continuous rotation of the rotor, non-electrical mechanical power means obtaining its power from a supply of mechanical potential energy and having an operative connection with the valve rotor so arranged that upon release of said energy supply to the power means the valve rotor is rotated continuously to complete said several regenerating operations, means for releasing and supplying said energy to start and operate said power means, speed governing means controlling said power means so as to regulate the speed of rotation of the valve rotor to a continuous slow rate providing predetermined periods of time for all of the several regenerating operations and means automatically stopping the power means after completion of said regenerative cycle and to set the valve for return to softening.

4. An automatic regenerative base exchange water softener according to claim 3 wherein the valve operating power means comprises a hydraulic cylinder with a piston arranged to be supplied with water under pressure and having a direct mechanical connection with the rotary valve and wherein the energy releasing means comprises a valve for supplying water under pressure to the cylinder.

5. An automatic regenerative base exchange water softener according to claim 3 in which the valve operating power means comprises a hydraulic cylinder with a piston arranged to be supplied with water under pressure and having a direct mechanical connection with the rotary valve, in which the energy releasing means comprises a valve for supplying water under pressure to the cylinder and piston and in which the speed governing means comprises an adjustable restricted orifice controlling the flow of water under pressure to the cylinder and piston.

6. An automatic regenerative base exchange water softener according to claim 3 wherein the rotary valve operating power means comprises a falling weight having a releasable operative connection with the rotary valve and adapted to be raised without rotating the valve and means stopping the weight to set the valve for return to softening.

7. In the apparatus combination of claim 3, speed governing and time regulating means comprising a centrifugal governor operatively connected to the mechanical power means and driven thereby.

8. In a regenerative base exchange water softener, automatically controlled regenerating apparatus comprising in combination a rotary multiport control valve including a ported rotor and a plurality of extended interport passages adapted to establish flows for a cycle of several regenerating operations and to maintain said flows upon continuous rotation of the rotor, non-electrical mechanical power means obtaining its power from a supply of mechanical potential energy and having an operative connection with the valve rotor so arranged that upon release of said energy supply to the power means said valve rotor is rotated continuously to complete said several regenerating operations, means for releasing and supplying said energy to start and operate said power means, speed governing means comprising a rotatory blade rotated by the power means, rotation of the blade being opposed by viscous fluid resistance against the blade, the speed governing means controlling said power means so as to regulate the speed of rotation of the valve rotor to a continuous slow rate providing predetermined periods of time for all of the several regenerating operations and means automatically stopping the power means after completion of said regenerative cycle and to set the valve for return to softening.

9. In a water softener comprising a container for zeolites, a source of brine, conduit connections for flows of hard water, soft water, brine and waste, a multiport rotary valve having a ported rotor and a plurality of interport passages adapted to make and maintain appropriate connections between said conduits for a plurality of regenerating stages including regenerating, rinsing, and return to softening during slow continuous rotation of the valve in either direction to and through positions corresponding to regenerating, rinsing and return to softening and to make appropriate connections for the softening stage at one angular position of the valve, a hydraulic cylinder, a piston sliding in the cylinder having an operative connection with the valve means changing the reciprocal motion of the piston into rotary motion, manually actuable starting means adapted upon actuation to introduce water into said cylinder on one side of the piston so as to move the piston and rotate the valve, and speed governing means operatively connected with the piston so as to regulate the speed of rotation of the valve means in either direction of rotation to a slow, steady, constant rate appropriate to the time required for the several regenerating stages, means adapted to stop the valve means in the angular position corresponding to the softening stage after completion of the regenerating stages and means for introducing water into the cylinder against the other side of the piston to move the piston back to starting position, the piston in such motion also operating the valve through its operating positions.

10. In a water softener comprising a container for zeolites, a source of brine, conduit connections for flows of hard water, soft water, brine and waste, multiport rotary valve means having a ported rotor and a plurality of interport passages adapted to make appropriate connections between said conduits for a plurality of regenerating stages including regenerating, rinsing and return to softening during continuous rotation of the valve means in one direction to and through positions corresponding to regenerating, rinsing and return to softening and to make appropriate connections for the softening stage at one angular position of the valve means, a hydraulic cylinder, a piston sliding in the cylinder and means connecting the piston with the valve means and changing the reciprocal motion of the piston into rotary motion, the piston being adapted to operate the valve means in one direction, manually actuable starting means adapted upon actuation to introduce water into said cylinder on one side of the piston so as to move the piston and rotate the valve, speed governing means operatively connected with the piston so as to regulate the speed of rotation of the valve means in one direction to a slow, steady, constant rate determining the time of said several regenerating connections, means for disengaging said governing means when the valve is operated in the opposite direction to allow rapid movement of the piston and valve in resetting, means adapted to stop the valve means in the angular position corresponding to the softening stage after completion of the regenerating stages, means for introducing water into the cylinder against the other side of the piston to move the piston back to starting position and means operatively connecting said means with the piston whereby at the end of the operating stroke said means for introducing water for the return stroke are released.

11. In a water softener comprising a container for zeolites, a source of brine, conduit connections for flows of hard water, soft water, brine and waste, a multiport rotary valve having a ported rotor and a plurality of interport passages adapted to make appropriate connections between said conduits for a plurality of regenerating stages including regenerating, rinsing and return to softening upon continuous rotation of the valve and to make appropriate connections for the softening stage at one angular position of the valve, a movable weight, releasable means operatively connecting the weight with the rotary valve so that the weight on being allowed to fall rotates and operates the valve, speed governing means, speed increasing means operatively connecting the speed governing means with the movable weight so as to regulate the speed of rotation of the valve by the falling weight to a slow, steady, constant rate determining the time of said several regenerating connections, means adapted to stop the valve means in the angular position corresponding to the softening stage, after completion of the regenerating stages and means for lifting the weight back to starting position to set the apparatus ready for a new cycle of operations.

FRANCIS NORWOOD BARD.